(12) United States Patent
Homma

(10) Patent No.: US 10,630,081 B2
(45) Date of Patent: Apr. 21, 2020

(54) CHARGE AND DISCHARGE CONTROL DEVICE

(71) Applicant: HONDA MOTOR CO., LTD., Tokyo (JP)

(72) Inventor: Keiichiro Homma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 15/916,841

(22) Filed: Mar. 9, 2018

(65) Prior Publication Data

US 2018/0262019 A1 Sep. 13, 2018

(30) Foreign Application Priority Data

Mar. 10, 2017 (JP) .................................. 2017-046584

(51) Int. Cl.
*H02J 7/00* (2006.01)
*B60L 53/53* (2019.01)
(Continued)

(52) U.S. Cl.
CPC ............ *H02J 7/0013* (2013.01); *B60L 53/53* (2019.02); *B60L 53/63* (2019.02); *B60L 53/65* (2019.02);
(Continued)

(58) Field of Classification Search
CPC ........ H02J 7/0013; H02J 7/047; H02J 7/0054; H02J 7/0027; H02J 3/32; H02J 7/0091;
(Continued)

(56) References Cited

U.S. PATENT DOCUMENTS

2006/0118162 A1* 6/2006 Saelzer ..................... B60L 8/00
  136/246
2009/0261587 A1* 10/2009 Lomax ..................... C10G 2/00
  290/7
(Continued)

FOREIGN PATENT DOCUMENTS

JP 2008-148408 A 6/2008
JP 2008-236902 A 10/2008
(Continued)

OTHER PUBLICATIONS

Dec. 4, 2018, Japanese Office Action issued for related JP Application No. 2017-046584.
(Continued)

*Primary Examiner* — M Baye Diao
(74) *Attorney, Agent, or Firm* — Paratus Law Group, PLLC

(57) ABSTRACT

A charge and discharge control device includes a control unit which controls charging and discharging of a plurality of storage batteries capable of exchanging electric power via an external electrical grid; and an acquisition unit which acquires a temperature of each of the storage batteries. When there are at least two storage batteries having a temperature equal to or lower than a threshold value among the plurality of storage batteries, the control unit controls the two storage batteries to repeatedly perform charging and discharging in turn between the two storage batteries.

9 Claims, 5 Drawing Sheets

(51) Int. Cl.
*H02J 3/32* (2006.01)
*B60L 53/65* (2019.01)
*B60L 53/67* (2019.01)
*B60L 53/63* (2019.01)
*H02J 7/34* (2006.01)

(52) U.S. Cl.
CPC ............... *B60L 53/67* (2019.02); *H02J 3/32* (2013.01); *H02J 7/0027* (2013.01); *H02J 7/0091* (2013.01); *H02J 7/007192* (2020.01); *H02J 7/342* (2020.01); *Y02T 10/7005* (2013.01)

(58) Field of Classification Search
CPC .......... B60L 53/67; B60L 53/53; B60L 53/65; B60L 53/63
USPC ........................................................ 320/153
See application file for complete search history.

(56) References Cited

U.S. PATENT DOCUMENTS

| | | |
|---|---|---|
| 2011/0084664 A1 | 4/2011 | White et al. |
| 2011/0084665 A1 | 4/2011 | White et al. |
| 2011/0215640 A1* | 9/2011 | Donnelly ................. H02J 1/10 307/21 |
| 2013/0110430 A1* | 5/2013 | Nishi ..................... H01M 10/48 702/63 |
| 2013/0335025 A1 | 12/2013 | Kuribayashi et al. |
| 2015/0130281 A1* | 5/2015 | Sabripour ................. H02J 3/32 307/66 |
| 2015/0136505 A1* | 5/2015 | Bystedt ................... B60L 15/40 180/167 |
| 2015/0251547 A1 | 9/2015 | Nonomura et al. |
| 2016/0190661 A1* | 6/2016 | Kuruma ............... H01M 10/635 701/36 |
| 2016/0336767 A1* | 11/2016 | Zane ...................... H02J 1/102 |
| 2019/0123369 A1* | 4/2019 | Ma ......................... H01M 8/04 |

FOREIGN PATENT DOCUMENTS

| | | |
|---|---|---|
| JP | 2013-507896 A | 3/2013 |
| JP | 2013-109859 A | 6/2013 |
| JP | 2015-154521 A | 8/2015 |
| JP | 2015-171219 A | 9/2015 |
| JP | 2015-525552 A | 9/2015 |
| JP | 2016-119167 A | 6/2016 |
| JP | 2016-146252 A | 8/2016 |
| WO | WO 2012/120977 A1 | 9/2012 |
| WO | WO 2016/147319 A1 | 9/2016 |

OTHER PUBLICATIONS

Aug. 28, 2018, Japanese Office Action issued for related JP Application No. 2017-046584.
May 7, 2019, Japanese Office Action issued for related JP Application No. 2017-046584.
Jul. 23, 2019, Japanese Office Action issued for related JP Application No. 2017-046584.

* cited by examiner

CHARGE AND DISCHARGE CONTROL DEVICE

CROSS-REFERENCE TO RELATED APPLICATIONS

The present application claims the benefit of priority of Japanese Patent Application No. 2017-046584, filed on Mar. 10, 2017, the content of which is incorporated herein by reference.

Technical Field

The present invention relates to a charge and discharge control device for a plurality of storage batteries.

Background Art

A secondary battery has characteristics that a discharge capacity and a charge capacity thereof are dependent on a temperature. For example, the charge capacity of a secondary battery deteriorates under a low-temperature environment. Accordingly, even when a secondary battery in a low-temperature environment is charged, the secondary battery would not exhibit a sufficient charge capacity. In view of this characteristics, JP-A-2013-109859 discloses a battery control device which keeps a secondary battery warm.

The battery control device described in JP-A-2013-109859 includes a plurality of charging/discharging devices connected to a local electrical grid. The charging/discharging devices are connected with plural batteries of electric vehicles for charging. A control device configuring the battery control device includes a temperature evaluation unit which evaluates a temperature of each battery to determine a heat-retentive battery required to be warmed, and a charge and discharge control unit which controls charging and discharging of the batteries. The charge and discharge control unit controls the charging/discharging device to discharge the heat-retentive battery which is dischargeable and controls the charging/discharging device to charge the heat-retentive battery which is chargeable. As a result, a heat-retentive current which can be used to maintain the temperature flows between the heat-retentive batteries during charging and discharging, so that the heat-retentive batteries can be warmed with self-heating.

In the battery control device disclosed in JP-A-2013-109859, electric power is shifted in one direction from the dischargeable heat-retentive battery to the chargeable heat-retentive battery, and the heat-retentive battery is self-heated due to generation of heat-retentive current caused by the shift of the electric power. However, the temperature rise of the battery due to the self-heating is not so large, and the sufficient temperature rise of the battery cannot be expected. Further, in the battery control device disclosed in JP-A-2013-109859, out of the heal-retentive batteries which need to maintain the temperature, a battery whose state of charge (SOC) is greater than a predetermined value is determined as a dischargeable battery, and a battery whose state of charge is lower than the predetermined value is determined as a chargeable battery. However, the temperature rise which occurs when the chargeable battery is determined based on such a state of charge and charged is not different from the temperature rise during a normal charging process. In addition, since the electric power is shifted in one direction from the dischargeable battery to the chargeable battery, it is necessary to recharge the dischargeable battery in order to recover the state of charge of the dischargeable battery which is reduced by the charging and discharging.

Accordingly, an aspect of the present invention provides a charge and discharge control device capable of sufficiently raising a temperature of a storage battery.

(1) An embodiment of the present invention provides a charge and discharge control device including:
  a control unit (e.g., a control unit 122 in an embodiment to be described) which controls charging and discharging of a plurality of storage batteries (e.g., storage batteries 113 in the embodiment) capable of exchanging electric power via an external electrical grid (e.g., an electrical grid 11 in the embodiment); and
  an acquisition unit (e.g., a radio unit 121 in the embodiment) which acquires a temperature of each of the storage batteries,
  wherein when there are at least two storage batteries having a temperature equal to or lower than a threshold value among the plurality of storage batteries, the control unit controls the two storage batteries to repeatedly perform charging and discharging in turn between the two storage batteries.

(2) In the charge and discharge control device of (1),
  the control unit may control to stop the charging and discharging between the two storage batteries when a temperature of at least one of the two storage batteries reaches a predetermined value or higher.

(3) in the charge and discharge control device of (1) or (2),
  the control unit may control the charging and discharging between the two storage batteries such that the two storage batteries have a charge power amount same as a discharge power amount.

(4) in the charge and discharge control device of (1) or (2),
  the control unit may control the charging and discharging between the two storage batteries by instructing each of the two storage batteries to charge and discharge by a charge power amount same as a discharge power amount.

(5) in the charge and discharge control device of (1),
  a device mounted thereon each storage battery may include:
    an electric device (e.g., a bidirectional charger 114 in the embodiment) for assisting the charging and discharging of the storage battery; and
    a temperature adjustment circuit (e.g., a temperature adjustment circuit 116 in the embodiment) for the electric device, the temperature adjustment circuit being connected to a temperature adjustment circuit of the storage battery.

(6) In the charge and discharge control device of any one of (1) to (5),
  at least one of the plurality of storage batteries is mounted in a transport vehicle (e.g., an electric vehicle 14 in the embodiment).

(7) The charge and discharge control device of any one of (1) to (6) may be provided in a server device (e.g., an aggregator 17 in the embodiment) which controls charging and discharging of the plurality of storage batteries according to an electric power demand from an electric power system.

(8) Another embodiment of the present invention provides a charge and discharge control device including:
  a storage battery (e.g., a storage battery 213 in an embodiment to be described) capable of exchanging electric power via an external electrical grid (e.g., an electrical grid 21 in the embodiment);

a control unit (e.g., an ECU 217 in the embodiment) which controls charging and discharging of the storage battery;

a detection unit (e.g., a temperature sensor 215 in the embodiment) which detects a temperature of the storage battery; and a communication unit (e.g., a digital communication unit 212 in the embodiment) which communicates with another charge and discharge control device, wherein when there are at least two charge and discharge control devices, each including a storage battery having a temperature equal to or lower than a threshold value, the control unit of one charge and discharge control device controls the control unit of the other charge and discharge control device using the communication unit, and wherein the control unit of the one charge and discharge control device controls the storage batteries of the two charge and discharge control devices including the one charge and discharge control device to repeatedly perform charging and discharging in turn between the storage batteries.

(9) In the charge and discharge control device of (8), the control unit of the one charge and discharge control device may control to stop the charging and discharging between the storage batteries when a temperature a temperature of at least one of the storage batteries of the two charge and discharge control devices reaches a predetermined value or higher.

(10) In the charge and discharge control device of (8) and (0), the control unit of the one charge and discharge control device may control the charging and discharging between the storage batteries of the two charge and discharge control devices such that the storage batteries have a charge power amount same as a discharge power amount.

(11) The charge and discharge control device of any one of (8) to (10) may further include:

an electric device (e.g., a bidirectional charger 214 in the embodiment) which assists the charging and discharging of the storage battery; and a temperature adjustment circuit (e.g., a temperature adjustment circuit 216 in the embodiment) for the electric device, the temperature adjustment circuit being connected to a temperature adjustment circuit of the storage battery.

(12) The charge and discharge control device of any one of (8) to (11) may be mounted in a transport vehicle (e.g., an electric vehicle 24 in the embodiment).

Advantageous Effects

According to the configuration of (1), since the charging and discharging are alternately repeated between two storage batteries having the temperature equal to or lower than the threshold value, the self-heating value of the storage battery increases and the temperature of the storage battery sufficiently rises.

According to the configuration of (2), since the charging and discharging is stopped at the time when the temperature of at least one of the two storage batteries reaches a predetermined value or higher, it is possible to prevent the temperature rise of the storage battery more than require.

According to the configuration of (3), the temperature of the storage battery can rise while the state of charge of the two storage batteries is not changed at the time of stopping the charging/discharging between two storage batteries. Further, since the state of charge is not changed, there is no need to compensate for the discharge or recharge.

According to the configuration of (5), since the heat generated in the electric device accompanying with the charging and discharging of the storage battery is transferred to the storage battery via the temperature adjustment circuit, it is possible to raise the temperature of the storage battery by not only the self-heating of the storage battery but also the heat generated in the electric device.

According to the configuration of (6), since the temperature of the storage battery can be raised before charging the storage battery mounted in the transport vehicle or discharging the storage battery due to driving of the transport vehicle, it is possible to maximize the charge/discharge capacity of the storage battery.

According to the configuration of (7), it is possible to maximize the charge/discharge capacity of the storage battery by raising the temperature of the storage battery before the charging/discharging of the storage battery according to the electric power demand from the electric power system.

According to the configuration of (8), since the charging and discharging are alternately repeated between two storage batteries having the temperature equal to or lower than the threshold value, the self-heating value of the storage battery increases, and the temperature of the storage battery sufficiently rises.

According to the configuration of (9), since the charging and discharging is stopped at the time when the temperature of at least one of the two storage batteries reaches a predetermined value or higher, it is possible to prevent the temperature rise of the storage battery more than require.

According to the configuration of (10), the state of charge of the two storage batteries is not changed at the time of stopping the charging/discharging between two storage batteries, and the temperature of the storage battery can rise. Further, since the state of charge is not changed, there is no need to compensate for the discharge or recharge.

According to the configuration of (11), since the heat generated in the electric device accompanying with the charging and discharging of the storage battery is transferred to the storage battery via the temperature adjustment circuit, it is possible to raise the temperature of the storage battery by not only the self-heating of the storage battery but also the heat generated in the electric device.

According to the configuration of (12), since the temperature of the storage battery can be raised before charging the storage battery mounted in the transport vehicle or discharging the storage battery due to driving of the transport vehicle, it is possible to maximize the charge/discharge capacity of the storage battery.

DESCRIPTION OF EMBODIMENTS

Embodiments of the invention will be described below with reference to the drawings.

First Embodiment

A Vehicle-to-Grid (V2G) system is a system which exchanges electric power between an electric power system including a commercial electrical grid and an electric vehicle and when the electric vehicle is not used as a transport means, a storage battery mounted in the electric vehicle is used as an electric power storage facility. Therefore, the electric power is bidirectionally exchanged between the electric vehicle participating in the V2G and the electric power system.

Figure 1:
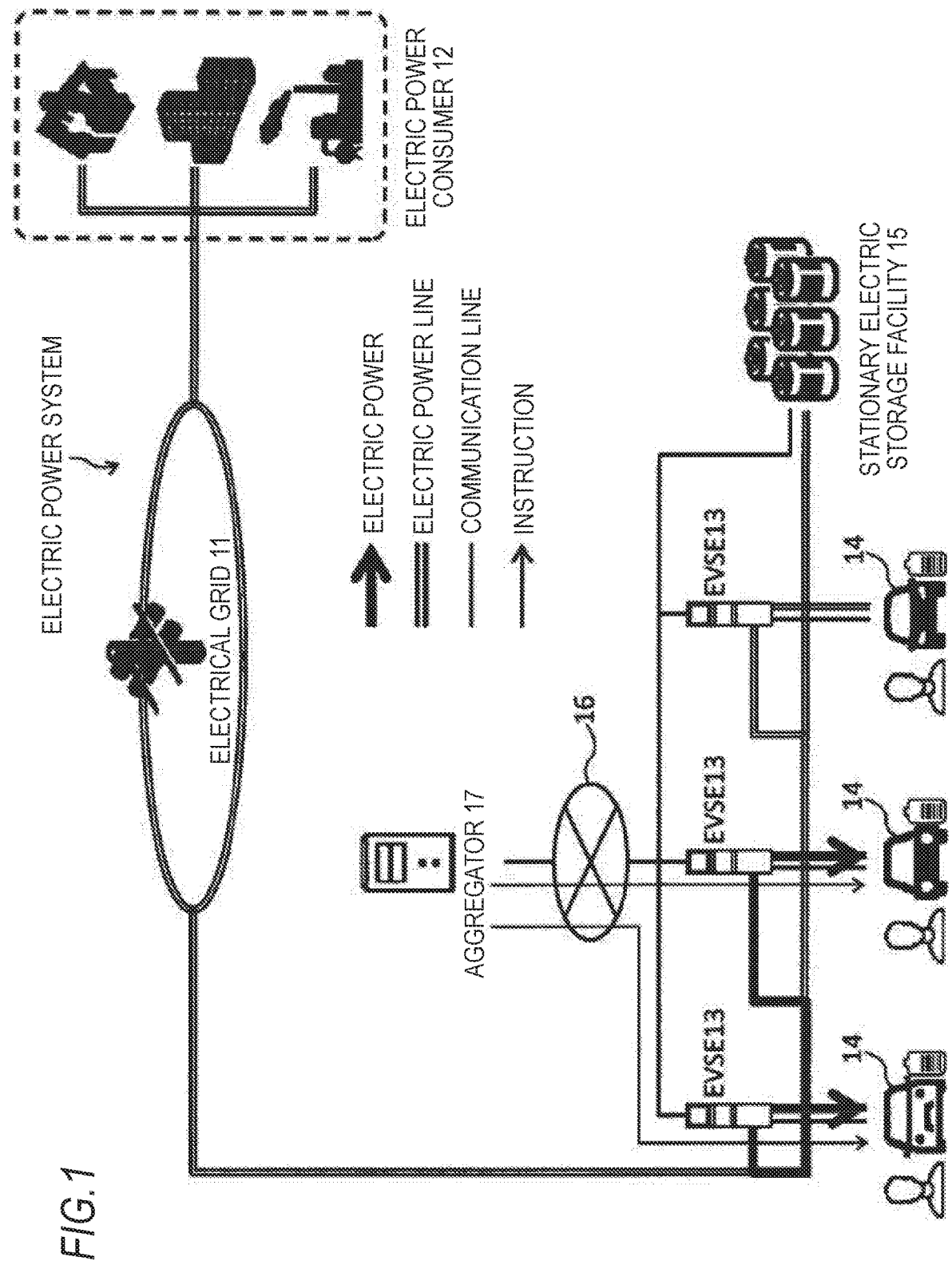
FIG. 1 is a diagram illustrating an entire configuration of a Vehicle to Grid (V2G) system.

FIG. 1 is a diagram illustrating an entire configuration of the V2G system. As illustrated in FIG. 1, the V2G system includes an electric power system, an Electric Vehicle Service Equipment (EVSE) 13, an electric vehicle 14, a stationary electric storage facility 15, a communication network 16, and an aggregator 17. The electric power system includes an electrical grid 11 which transmits electric power generated by a power plant for generating electric power by energy of thermal power, wind power, atomic power, sunlight and the like, and an electric power consumer 12 which receives the supply of electric power in accordance with electricity demand. The EVSE 13 is an external power supply connected to the electrical grid 11 via a power distribution facility (not illustrated). The electric vehicle 14 such as Electric Vehicle (EV) or Plug-in Hybrid Electric Vehicle (PHEV) mounted with a chargeable/dischargeable storage battery. The stationary electric storage facility 15 is installed with a number of chargeable/dischargeable storage batteries. The aggregator 17 manages charging and discharging of the storage battery included in the electric vehicle 14 and charging and discharging of the stationary electric storage facility 15 via the EVSE 13 connected to the communication network 16. In the example illustrated in FIG. 1, the aggregator 17 manages three electric vehicles 14 respectively connected to three EVSEs 13 and one stationary electric storage facility 15 connected to the electric grid 11.

Since the EVSE 13, the stationary electric storage facility 15, and the aggregator 17 are connected to each other via a wired or wireless communication network, instructions relating to charging and discharging of the storage batteries included in the electric vehicle 14 or the stationary electric storage facility 15 or information relating to the state of the storage batteries can be transmitted and received among the electric vehicle 14, the stationary electric storage facility 15, and the aggregator 17 which are connected to the EVSE 13.

Figure 2:
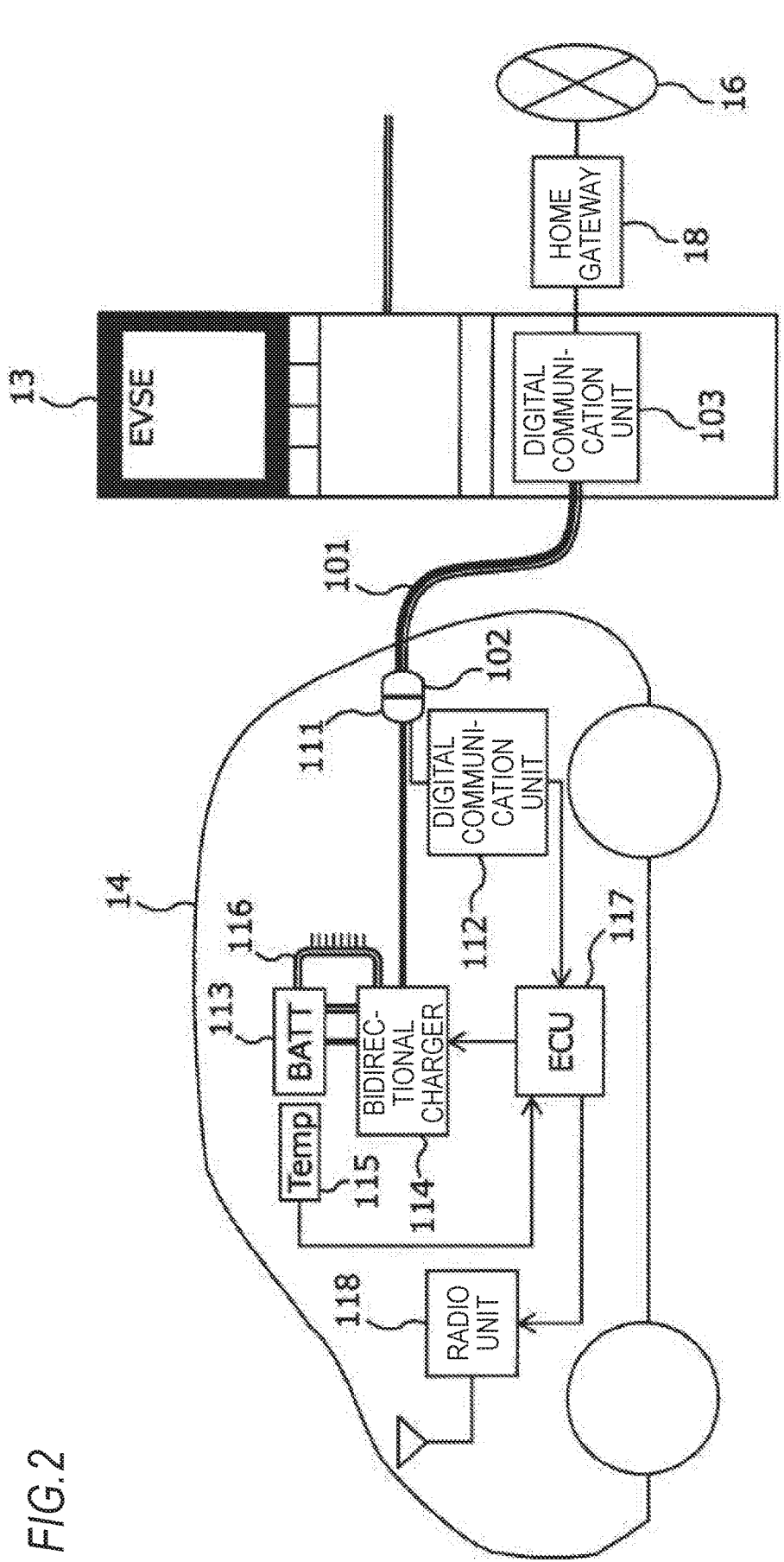
FIG. 2 is a block diagram illustrating an Electric Vehicle Service Equipment (EVSE) and electric vehicle which are parts of the V2G system illustrated in FIG. 1.

FIG. 2 is a block diagram illustrating the EVSE 13 and the electric vehicle 14 which are parts of the V2G system illustrated in FIG. 1. As illustrated in FIG. 2, the EVSE 13 includes a cable 101, a connector 102 provided at a tip of the cable 101, and a digital communication unit 103. The electric vehicle 14 includes an inlet 111, a digital communication unit 112, a chargeable/dischargeable storage battery (BATT) 113, a bidirectional charger 114, a temperature sensor (Temp) 115, a temperature adjustment circuit 116, an Electronic Control Unit (ECU) 117, and a radio unit 118.

The stationary electric storage facility 15 has the same configuration as that of the electric vehicle 14.

Each element of the EVSE 13 will be described below.

The connector 102 exchanges electric power between the EVSE 13 and the electric vehicle 14 in a state of being connected to the inlet 111 of the electric vehicle 14. The digital communication unit 103 is connected to the communication network 16 via a home gateway 18 and superimposes a signal obtained from the aggregator 17 on electricity, which is exchanged between the EVSE 13 and the electric vehicle 14, by using a power line communication (PLC) technology. Therefore, a signal from the aggregator 17 is sent to the electric vehicle 14 and a signal from the electric vehicle 14 is sent to the aggregator 17 when the connector 102 is being connected to the inlet 111 of the electric vehicle 14.

Next, each element of the electric vehicle 14 will be described.

The connector 102 of the EVSE 13 can be detachably attached to the inlet 101. The digital communication unit 112 receives the signal superimposed on the electricity obtained from the EVSE 13 using the power line communication technology in the state in which the connector 102 of the EVSE 13 is attached to the inlet 111. The connection form between the EVSE 13 and the electric vehicle 14 is not limited to a physical connection between the inlet 111 and the connector 102 and may include an electromagnetic connection such as non-contact charge/discharge in a state in which the inlet 111 and the connector 102 are provided in the vicinity of each other. In any case, when the inlet 111 and the connector 102 are electromagnetically connected to each other, the digital communication unit 112 can receive the signal from the EVSE 13 using the power line communication technology and transmit the signal to the EVSE 13.

The storage battery 113 includes a plurality of storage cells such as a lithium-ion battery or a nickel-hydrogen battery. The storage battery 113 supplies electric power to an electric motor (not shown) or the like, which is a drive source of the electric vehicle 14, in a state where the electric vehicle 14 is not connected to the EVSE 13. In a state where the electric vehicle 14 is connected to the EVSE 13, the storage battery 113 performs charging and discharging according to an instruction sent from the aggregator 17.

The bidirectional charger 114 converts an AC voltage obtained via the EVSE 13 into a DC voltage. The electric power converted into the DC voltage by the bidirectional charger 114 is charged in the storage battery 113. Further, the bidirectional charger 114 converts a DC voltage discharged from the storage battery 113 into an AC voltage. The electric power converted into the AC voltage by the bidirectional charger 114 is sent to the outside of the electric vehicle 14 via the inlet 111.

The temperature sensor 115 detects a temperature of the storage battery 113. A signal indicating the temperature detected by the temperature sensor 115 is sent to the ECU 117.

The temperature adjustment circuit 116 circulates heat through a medium such as air, cooling water, or cooling oil over both the storage battery 113 and the bidirectional charger 114. Therefore, if there is a temperature difference between the storage battery 113 and the bidirectional charger 114, heat is transferred from one side to the other side via the temperature adjustment circuit 116.

The ECU 117 controls the operation of the bidirectional charger 114 in response to the instruction indicated by the signal from the aggregator 17 received by the digital communication unit 112.

The radio unit 118 wirelessly transmits information indicating the temperature of the storage battery 113 sent to the ECU 117, to the aggregator 17. The temperature is detected by the temperature sensor 115.

In response to a request from an electric power company for operating the power plant or a power transmission company for operating the electrical grid 11, the aggregator 17, which is a part of the V2G system illustrated in FIG. 1, manages charging and discharging between an electric power supply source (hereinafter, the electric vehicle 14 and the stationary electric storage facility 15 are collectively referred to as "electric power supply source") including the electric vehicle 14 and the stationary electric storage facility 15 and the electrical grid 11. When a storage battery of the electric power supply source is lowered in temperature, the aggregator 17 performs control to raise the temperature of the storage battery. The control to raise the temperature is performed before the electric power supply source performs charging and discharging.

Figure 3:
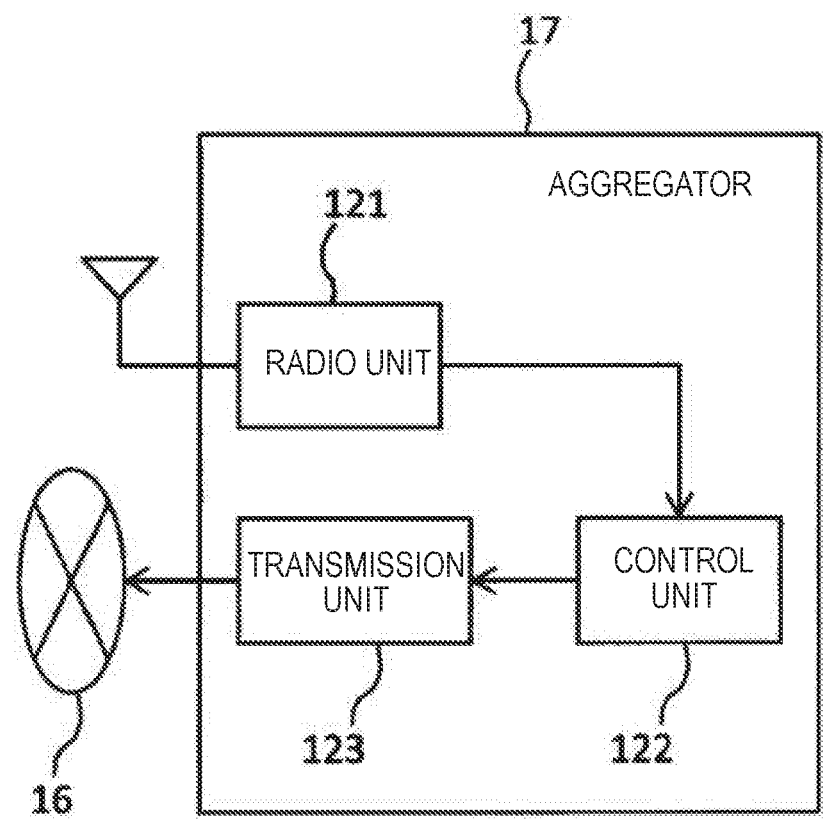
FIG. 3 is a block diagram illustrating an internal configuration of an aggregator which is a part of the V2G system illustrated in FIG. 1.

FIG. 3 is a block diagram illustrating an internal configuration of the aggregator 17. As illustrated in FIG. 3, the aggregator 17 includes a radio unit 121, a control unit 122, and a transmission unit 123.

The radio unit 121 receives a radio signal indicating the temperature of the storage battery 113 of each electric power supply source. The radio signal is transmitted from the radio unit 118 of the electric power supply source. The information received by the radio unit 121 is sent to the control unit 122.

When the electric power supply source managed by the aggregator 17 includes at least two storage batteries 113 having a temperature equal to or lower than a threshold value, the control unit 122 controls arbitrarily selected storage batteries of the electric power supply source to repeatedly performs charging and discharging in turn between the two storage batteries to performs control to shift the electric power between the two storage batteries. That is, the control unit 122 instructs one of two the electric power supply sources having the two storage batteries, respectively, to perform discharging for a certain period of time, and instructs the other of the electric power supply sources to perform charging for a certain period of time. After a certain period of time elapses, the control unit 122 instructs the electric power supply source, which is subjected to the discharging instruction, to perform charging for a certain period of time, and instructs the electric power supply source, which is subjected to the charging instruction, to perform discharging for a certain period of time. In this way, since the control unit 122 alternately instructs charging or discharging to two electric power supply sources every a certain period of time, two storage batteries have the same charge power amount and discharge power amount by charging and discharging. The control unit 122 stops the charging/discharging instructions at the time when the temperature of at least one of the two storage batteries reaches a predetermined temperature or higher.

The transmission unit 123 transmits a signal indicating the instruction to be executed by the control unit 122 to the electric power supply source to which the instruction is issued, via the communication network 16.

As described above, according to the embodiment, when the electric power supply source managed by the aggregator 17 includes at least two storage batteries 113 having a temperature equal to or lower than a threshold value, since the charging and discharging are alternately repeated between the two low-temperature storage batteries of the electric power supply source in response to the instructions from the aggregator 17, a self-heating value of the storage battery 113 increases such that the temperature of the storage battery 113 sufficiently rises. Further, since a state of charge of the two storage batteries charged and discharged according to the instructions from the aggregator 17 is controlled such that the storage batteries have the same charge power amount and discharge power amount at the time of stopping the charging/discharging, the state of charge is unchanged compared to the state before the charging/discharging, except for power conversion loss. Therefore, there is no need to compensate for the discharge or recharge. Further, since the aggregator 17 stops the charging/discharging instruction at the time when the temperature of at least one of the two storage batteries reaches the predetermined temperature or higher, it is possible to prevent a temperature rise of the storage battery more than required.

Further, since the heat generated by the bidirectional charger 114 in accordance with the charging and discharging of the storage battery 113 in the electric power supply source is transferred to the storage battery 113 via the temperature adjustment circuit 116, it is possible to raise the temperature of the storage battery 113 by not only the self-heating of the storage battery 113 but also the heat generated by the bidirectional charger 114.

The temperature of the storage battery 113 can be raised before charging the storage battery 113 mounted in the electric vehicle 14 or discharging the storage battery 113 due to driving of the electric vehicle 14, it is possible to maximize the charge/discharge capacity of the storage battery 113.

Further, it is possible to maximize the charge/discharge capacity of the storage battery 113 by raising the temperature of the storage battery 113 before the charging/discharging of the storage battery 113 according to the electric power demand from the electric power system.

Second Embodiment

Figure 4:
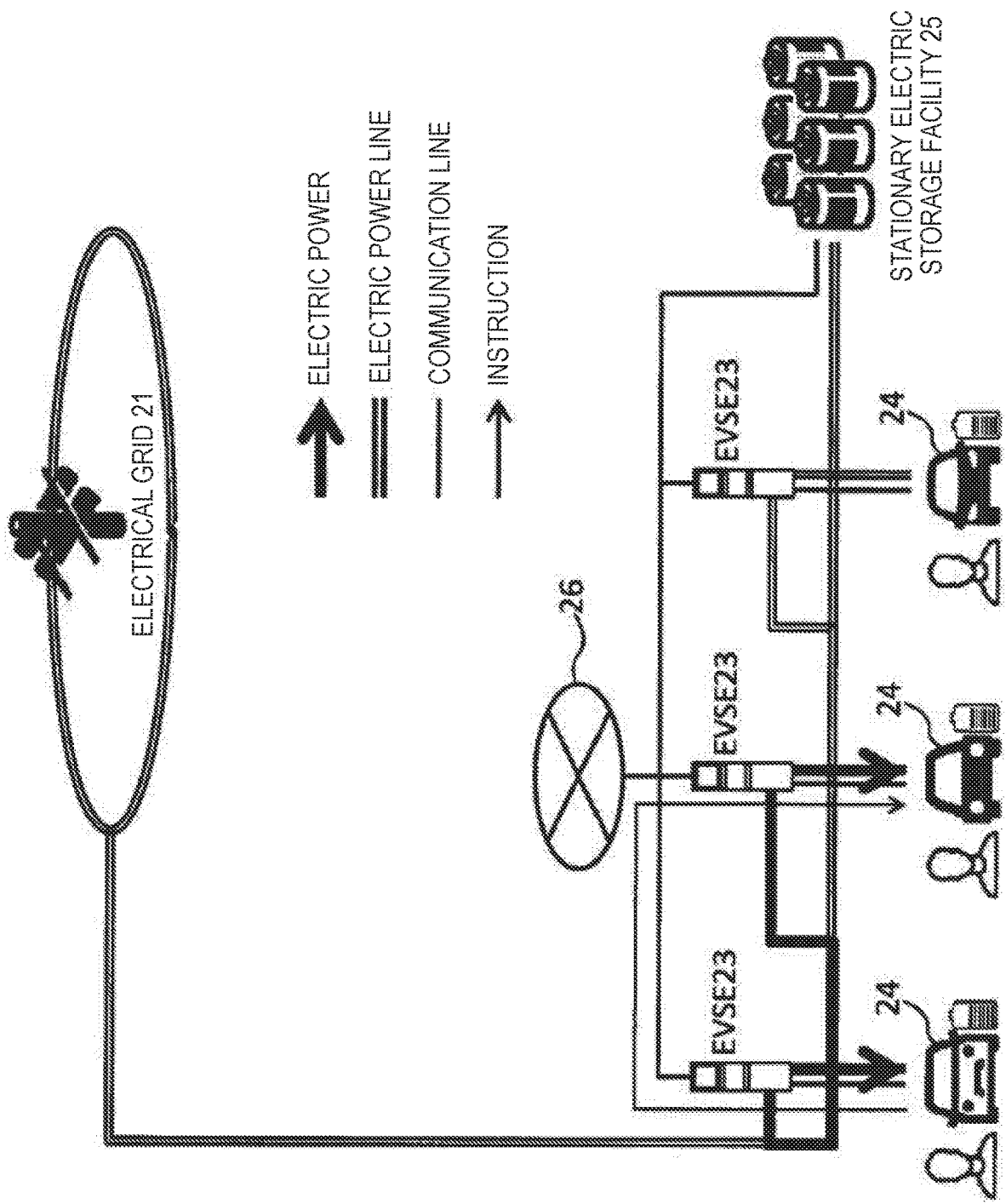
FIG. 4 is a diagram illustrating a system including three electric vehicles and a stationary electric storage facility which are connected to the EVSE.

FIG. 4 is a diagram illustrating a system including three electric vehicles and a stationary electric storage facility which are connected to EVSEs. The system illustrated in FIG. 4 includes an Electric Vehicle Service Equipment (EVSE) 23 which is an external power supply connected to an electrical grid 21 via a power distribution facility (not shown) or the like, an electric vehicle 24 such as Electric Vehicle (EV) or Plug-in Hybrid Electric Vehicle (PHEV) mounted with a chargeable/dischargeable storage battery, a stationary electric storage facility 25 in which a number of chargeable/dischargeable storage batteries are installed, and a communication network 26.

In the example illustrated in FIG. 4, the three electric vehicles 24 are connected to three EVSEs 23, respectively. The EVSE 23 and the stationary electric storage facility 25 are connected to each other via the communication network 26, so that instructions relating to charging and discharging of the storage batteries included in the electric vehicles 24 or the stationary electric storage facility 25 or information relating to the state of the storage batteries can be transmitted and received between the electric vehicles 24 and the stationary electric storage facility 25 which are connected to the EVSE 23.

Figure 5:
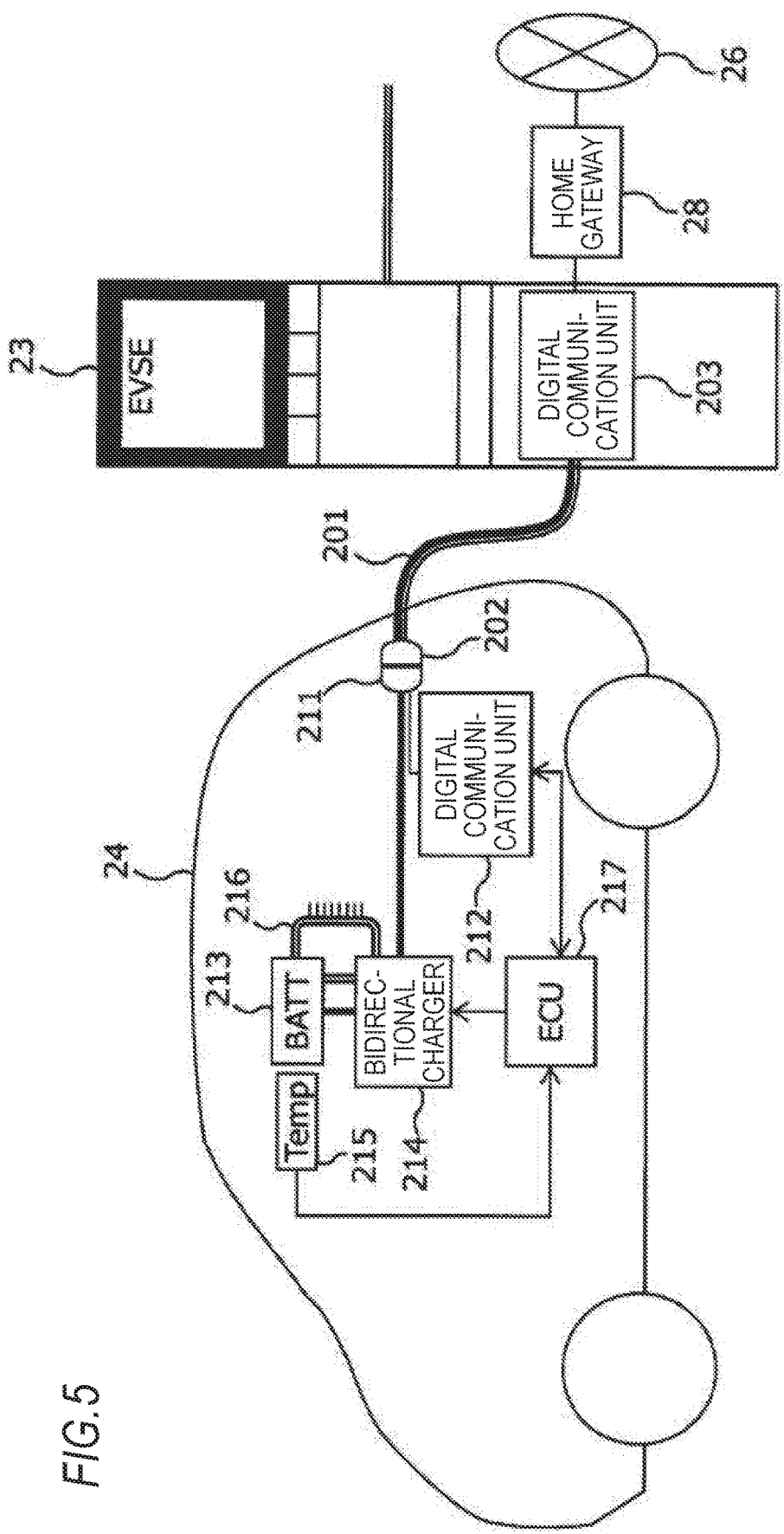
FIG. 5 is a block diagram illustrating the EVSE and electric vehicle which are parts of the system illustrated in FIG. 4.

FIG. 5 is a block diagram illustrating the EVSE 23 and the electric vehicle 24 which are parts of the V2G system illustrated in FIG. 4. As illustrated in FIG. 5, the EVSE 23 includes a cable 201, a connector 202 provided at a tip of the cable 201, and a digital communication unit 203. The electric vehicle 24 includes an inlet 211, a digital communication unit 212, a chargeable/dischargeable storage battery (BATT) 213, a bidirectional charger 214, a temperature sensor (Temp) 215, a temperature adjustment circuit 216, and an Electronic Control Unit (ECU) 217. The stationary electric storage facility 25 has the same configuration as that of the electric vehicle 24.

Each element of the EVSE 23 will be described below.

The connector 202 exchanges electric power between the EVSE 23 and the electric vehicle 24 in a state of being connected to the inlet 211 of the electric vehicle 24. The digital communication unit 203 is connected to the communication network 26 via a home gateway 28 and superimposes a signal on electricity, which is exchanged between the EVSE 23 and the electric vehicle 24, by using a power line communication (PLC) technology. Therefore, when the connector 202 is connected to the inlet 211 of the electric vehicle 24, a signal can he transmitted and received to and from the other electric vehicle 24 or the stationary electric storage facility 25 which is connected to the EVSE 23.

Next, each element of the electric vehicle 24 will be described.

The connector 202 of the EVSE 23 can be detachably attached to the inlet 201. The digital communication unit 212 receives the signal superimposed on the electricity obtained from the EVSE 23 using the power line communication technology in the state in which the connector 202 of the EVSE 23 is attached to the inlet 211. The connection form between the EVSE 23 and the electric vehicle 24 is not limited to a physical connection between the inlet 211 and the connector 202 and may include an electromagnetic connection such as non-contact charge/discharge in a state in which the inlet 211 and the connector 202 are in the vicinity of each other. In any case, when the inlet 211 and the connector 202 are electromagnetically connected to each other, the digital communication unit 212 can receive the signal from the EVSE 23 using the power line communication technology and also transmit the signal to the EVSE 23.

The storage battery 213 includes a plurality of storage cells such as a lithium-ion battery or a nickel-hydrogen battery. The storage battery 213 supplies electric power to an electric motor (not shown) or the like, which is a drive source of the electric vehicle 24, in a state where the electric vehicle 24 is not connected to the EVSE 23. In a state where the electric vehicle 24 is connected to the EVSE 23, the storage battery 213 performs charging and discharging according to an instruction sent from itself or the other electric vehicle 24.

The bidirectional charger 14 converts an AC voltage obtained via the EVSE 23 into a DC voltage. The electric power converted into the DC voltage by the bidirectional charger 214 is charged in the storage battery 213. Further, the bidirectional charger 214 converts a DC voltage discharged from the storage battery 213 into an AC voltage. The electric power converted into the AC voltage by the bidirectional charger 214 is sent to the outside of the electric vehicle 24 via the inlet 211.

The temperature sensor 215 detects a temperature of the storage battery 213. A signal indicating the temperature detected by the temperature sensor 215 is sent to the ECU 217.

The temperature adjustment circuit 216 circulates heat through a medium such as air, cooling water, or cooling oil over both the storage battery 213 and the bidirectional charger 214. Therefore, if there is a temperature difference between the storage battery 213 and the bidirectional charger 214, heat is transferred from one side to the other side via the temperature adjustment circuit 216.

The ECU 217 controls the digital communication unit 212 to transmit information or an instruction indicating the temperature of the storage battery 213 detected by the temperature sensor 215 to the other electric vehicle 24 connected to the EVSE 23. When a temperature of the storage battery 213 is lowered, the ECU 217 performs control to raise the temperature of the storage battery 213. The control to raise the temperature is performed before the electric vehicle 24 performs charging and discharging. Further, the ECU 217 performs processing according to the instruction from another electric power supply source (hereinafter, the electric vehicle 24 and the stationary electric storage facility 25 are collectively referred to as "electric power supply source") including the electric vehicle 24 and the stationary electric storage facility 25. The instruction is sent via the communication network 26.

When the temperature rising control is performed on the storage battery 213 having a temperature equal to or lower than a threshold value, the ECU 217 refers to information indicating the temperature of the storage battery 213 of another electric power supply source obtained from the digital communication unit 212. When there are at least two electric power supply source including the own storage battery 213 having the temperature equal to or lower than the threshold value, the ECU 217 repeatedly performs charging and discharging in turn between one arbitrarily selected storage battery of the electric power supply source and its own storage battery 213 and performs control to shift the electric power between the two storage batteries. That is, the ECU 217 instructs its own storage battery to perform discharging for a certain period of time, and instructs the selected electric power supply source to perform charging for a certain period of time. After a certain period of time elapses, the ECU 217 performs the charging on its own storage battery for a certain period of time, and instructs the electric power supply source, which is subjected to the charging instruction, to perform discharging for a certain period of time. In this way, since the ECU 217 alternately performs the charging instruction or the discharging instruction to two electric power supply sources including its own storage battery every a certain period of time, two storage batteries have the same charge power amount and discharge power amount by charging and discharging. The ECU 217 stops the charging/discharging instruction at the time when the temperature of at least one of its own storage battery 213 and the storage battery 213 of the electric power supply source which receives the charging/discharging instruction reaches a predetermined temperature or higher.

As described above, according to the embodiment, during the temperature rising control of the storage battery 213 having the temperature equal to or lower than the threshold value, when there are at least two electric power supply sources including the storage battery 213 having the temperature equal to or lower than the threshold value, since the charging and discharging are alternately repeated between the two low-temperature storage batteries of the electric power supply source, a self-heating value of the storage battery 213 increases such that the temperature of the storage battery 213 sufficiently rises. Further, since a state of charge of the two storage batteries charged and discharged is controlled such that the storage batteries have the same charge power amount and discharge power amount at the time of stopping the charging/discharging, the state of charge is unchanged compared to the state before the charging/discharging, except for power conversion loss. Therefore, there is no need to compensate for the discharge or recharge. Further, since the ECU 217 stops the charging/discharging process and instruction at the time when the temperature of at least one of the two storage batteries reaches the predetermined temperature or higher, it is possible to prevent a temperature rise of the storage battery more than required.

Further, since the heat generated by the bidirectional charger 214 in accordance with the charging and discharging of the storage battery 213 in the electric power supply source is transferred to the storage battery 213 via the temperature adjustment circuit 216, it is possible to raise the temperature of the storage battery 213 by not only the self-heating of the storage battery 213 but also the heat generated by the bidirectional charger 214.

The temperature of the storage battery 213 can be raised before charging the storage battery 213 mounted in the electric vehicle 24 or discharging the storage battery 213 due to driving of the electric vehicle 24, it is possible to maximize the charge/discharge capacity of the storage battery 213.

The invention is not limited to the above-described embodiments but may be appropriately modified and improved. For example, the information indicating the temperature of the storage battery 113 is wirelessly transmitted to the aggregator 17 by the radio unit 118 in the electric vehicle 14 of the first embodiment, but may be transmitted via the digital communication unit 112 and the EVSE 13 using the power line communication technology.

The invention claimed is:

1. A charge and discharge control device comprising:
   a control unit which controls charging and discharging of a plurality of storage batteries capable of exchanging electric power via an external electrical grid; and
   an acquisition unit which acquires a temperature of each of the storage batteries,
   wherein when there are at least two storage batteries having a temperature equal to or lower than a threshold value among the plurality of storage batteries, the control unit controls the two storage batteries to repeatedly perform charging and discharging in turn between the two storage batteries, and
   wherein a device mounted thereon each storage battery includes:
      an electric device which assists the charging and discharging of the storage battery; and
      a temperature adjustment circuit for the electric device, the temperature adjustment circuit being connected to a temperature adjustment circuit of the storage battery.

2. The charge and discharge control device according to claim 1,
   wherein the control unit controls to stop the charging and discharging between the two storage batteries when a temperature of at least one of the two storage batteries reaches a predetermined value or higher.

3. The charge and discharge control device according to claim 1,
   wherein the control unit controls the charging and discharging between the two storage batteries such that the two storage batteries have a charge power amount same as a discharge power amount.

4. The charge and discharge control device according to claim 1,
   wherein the control unit controls the charging and discharging between the two storage batteries by instructing each of the two storage batteries to charge and discharge by a charge power amount same as a discharge power amount.

5. The charge and discharge control device according to claim 1,
   wherein at least one of the plurality of storage batteries is mounted in a transport vehicle.

6. A charge and discharge control device comprising:
   a storage battery which is capable of exchanging electric power via an external electrical grid;
   a control unit which controls charging and discharging of the storage battery;
   a detection unit which detects a temperature of the storage battery;
   an electric device which assists the charging and discharging of the storage battery;
   a temperature adjustment circuit for the electric device, the temperature adjustment circuit being connected to a temperature adjustment circuit of the storage battery; and
   a communication unit which communicates with another charge and discharge control device,
   wherein when there are at least two charge and discharge control devices, each including a storage battery having a temperature equal to or lower than a threshold value, the control unit of one charge and discharge control device controls the control unit of the other charge and discharge control device using the communication unit, and
   wherein the control unit of the one charge and discharge control device controls the storage batteries of the two charge and discharge control devices including the one charge and discharge control device to repeatedly perform charging and discharging in turn between the storage batteries.

7. The charge and discharge control device according to claim 6,
   wherein the control unit of the one charge and discharge control device controls to stop the charging and discharging between the storage batteries when a temperature of at least one of the storage batteries of the two charge and discharge control devices reaches a predetermined value or higher.

8. The charge and discharge control device according to claim 6,
   wherein the control unit of the one charge and discharge control device controls the charging and discharging between the storage batteries of the two charge and discharge control devices such that the storage batteries have the charge power amount same as a discharge power amount.

9. The charge and discharge control device according to claim 6, which is mounted in a transport vehicle.

* * * * *